Figure 1:
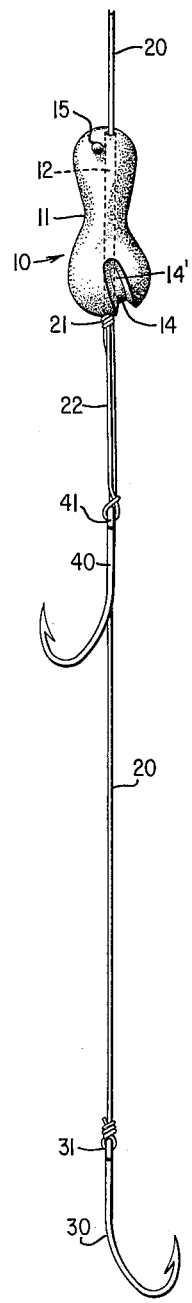

Sept. 24, 1963  D. B. HAVEL  3,104,487
FISHING SINKER

Filed March 1, 1961  2 Sheets-Sheet 1

INVENTOR.
DONALD B. HAVEL
BY
*Irons, Birch, Swindler, & McKie*
ATTORNEYS.

Sept. 24, 1963     D. B. HAVEL     3,104,487
FISHING SINKER
Filed March 1, 1961     2 Sheets-Sheet 2
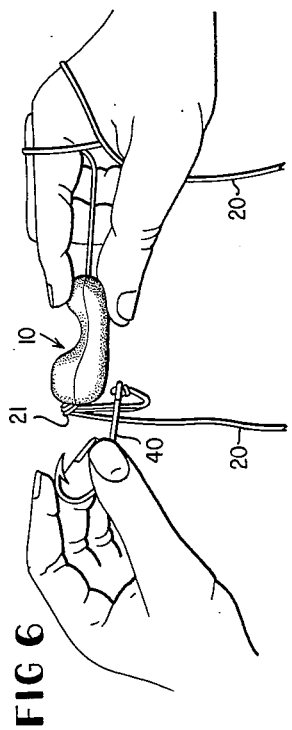
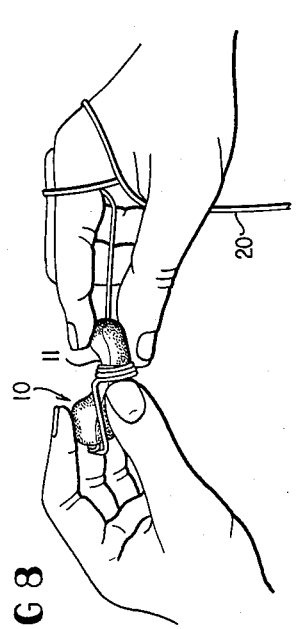
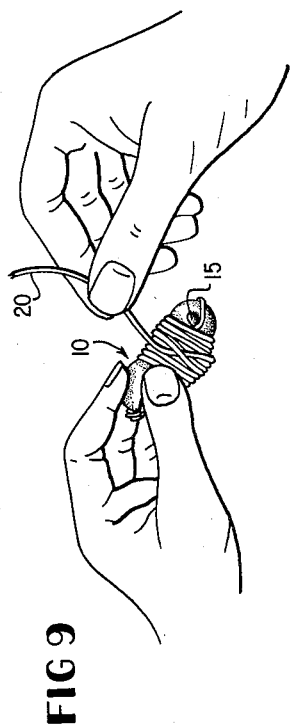
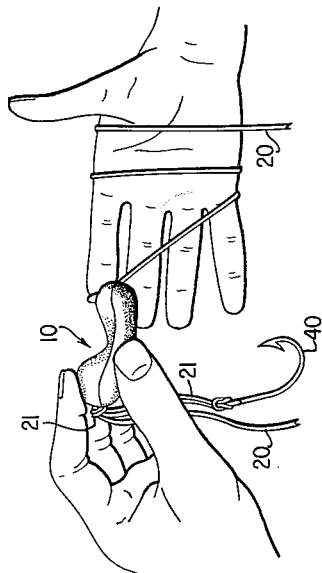
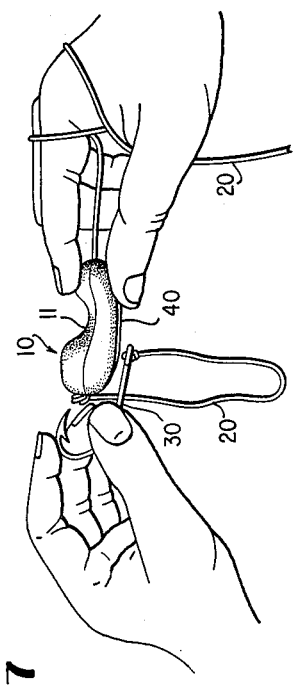
INVENTOR.
DONALD B. HAVEL
BY
*Irons, Birch, Swindler, & McKie*
ATTORNEYS.

_United States Patent Office_

3,104,487
Patented Sept. 24, 1963

3,104,487
FISHING SINKER
Donald B. Havel, Clyde, Kans.
Filed Mar. 1, 1961, Ser. No. 92,554
3 Claims. (Cl. 43—43.11)

This invention relates to an improved fishing sinker, and more particularly to a fishing sinker with which fishhooks and line associated with the fishhooks may be carried with convenience and complete safety when not in use.

In fishing equipment, it is common practice to fix to the line, near the hook or lure, a suitable weight or sinker of heavy material, usually lead, to cause the baited fishhook or lure to sink beneath the surface of the water. When not in use, the fishhooks with their sharp barbed points have heretofore presented a serious problem in handling. If some safety provision is not made, the sharp barbs can easily lodge in the hand or other part of the body, or even in the clothing of the fisherman who is not exceedingly careful. In order to enable the fishhooks to be safely stored, it is often necessary to detach them from the fishing line. If left on the line, or if left on line to which the sinker remains attached, the safety problem is not only aggravated, but in addition, the fisherman runs the risk of entangling the line or snarling the fishhooks in anything with which they may come in contact.

It is an object of this invention to provide an improved fishing sinker which permits fishing hooks, when not in use, to be stored with the sinker along with the line which may be associated with the fishhooks.

Still another object of this invention is to provide an improved fishing sinker which may be left almost indefinitely attached to the one or more fishhooks with which it is to be used without requiring its attachment and detachment therefrom before and after each use.

Still another object of this invention is to provide an improved fishing sinker which enables the one or more fishhooks to which it is attached when in use to be carried with the sinker without danger of their being lost and without danger of any injury or damage caused by the barbs of the hook or hooks.

Briefly, and in accordance with one aspect of my invention, I provide a fishing sinker adapted for attachment to a fishing line and comprising a body having a groove for retaining therein one or more fishhooks with the barb on the curved head of each fishhook contained within the exterior surface of the body and retained in place in the groove by means which enables the fishing line to be wrapped around the body and the fishhook.

Figure 2:
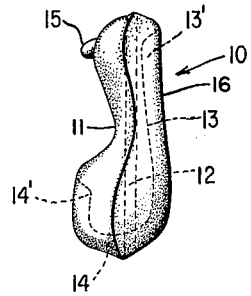
Figure 3:
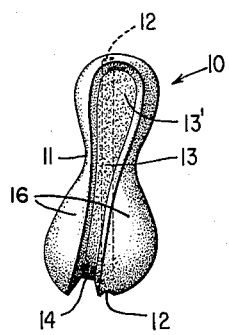
Figure 4:
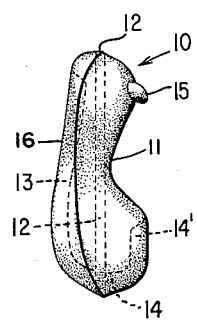

Further objects, features and attending advantages of the invention will become apparent by reference to the following detailed description and accompanying drawings, in which:

FIGURE 1 is a view of the fishing sinker of this invention attached to a fishing line to which, in turn, there has been attached a pair of fishhooks, FIGURE 2 is a side elevational view of one side of the sinker, FIGURE 3 is a side elevational view of the sinker from the side opposite that illustrated in FIGURE 1, FIGURE 4 is a side elevational view of the sinker from the side opposite that illustrated in FIGURE 2, FIGURES 5 through 9 are views illustrating the steps to be taken in storing one or more fishhooks in the groove provided in the sinker and in wrapping the fishing line around the sinker to secure the fishhooks firmly in place.

With reference to FIGURE 1, there is generally indicated at 10 the body of the sinker forming this invention. The body is of a shape resembling a peanut, in that it is provided with a neck 11, illustrated as being located substantially midway between the ends of the sinker. The purpose of this configuration will be more fully set forth below.

It will be understood that any suitable means may be provided for permitting the sinker to be attached to a fishing line. However, in the embodiment specifically illustrated a hole 12 is shown running the length of the sinker 10 to permit the fishing line to be passed through the body of the sinker and secured in relation thereto.

As best illustrated by reference to either FIGURES 2 or 4, the sinker body has an exterior surface 16 which surface is substantially straight lengthwise of the sinker body and curved crosswise of such body. As also shown in FIGURES 2 and 4, there is provided in the body of sinker 10 a groove, shown in dotted lines on FIGURES 2 and 4, and comprising a first portion 13, extending lengthwise of the sinker body generally following the substantially straight contour of the body surface 16, and a second portion 14 which curves with the contour of the end of the sinker body. It will be apparent that the groove so formed follows the general curvature of the fishhook, so that the long portion 13 of the groove will accommodate the shank of a fishhook and the curved portion 14 will accommodate the curved head. The extreme end portion 14' of the curved portion 14 of the fishhook groove is made sufficiently deep that, when a fishhook is disposed in the groove, the barb is contained totally within the groove, although preferably not in contact with the material of the sinker which would thus tend to dull the fishhook. The end portion 14' terminates in a shoulder which is best illustrated in FIGURES 1 and 2 which faces and protects the point of the fishhook when the latter is mounted on the sinker body. However, the fishhook barb is safely recessed beneath the exterior surface of the sinker body where it cannot be contacted by normal handling so long as the fishhook is retained firmly seated within the groove.

Since most fishhooks are provided with an eye at the end of the shank for purposes of tying onto the fishing line, I prefer to provide, at the extreme end of the straight portion 13 of the groove a widened out portion 13'. Thus, the groove so formed will accommodate the entire fishhook entirely beneath the exterior or peripheral surface of the sinker body, and depending upon the size and thickness of fishhook used, may easily accommodate two fishhooks, one against the other.

Formed integral with or affixed to one end of sinker 10 is a protruding stud or boss 15, the purpose of which will be hereinafter described. With reference to FIGURE 1, there is shown a length of fishing line which passes through hole 12 in sinker 10. At the extreme end of line 20 there is tied a first fishhook 30. It will be apparent that line 20 may be knotted, as at 21, so as to support sinker 10 when line 20 is suspended, as from another line or fishing pole, not shown. In forming knot 21, a loop 22 may also be formed to which may be tied a second fishhook 40. In the conventional manner, fishhooks 30 and 40 are provided with eyes 31 and 41, respectively, to permit tying of the fishing line thereto.

With reference now to FIGURES 5 through 9, the manner in which fishhooks 30 and 40 are stored with sinker 10 when not in use will be described. It will be apparent to those skilled in the art that an exact sequence need not be rigidly followed, since this invention lends itself to immediate utilization by reason of its convenience and simplicity. However, for purposes of illustration, a suitable sequence of steps for storing the fishhooks and associated line will be described.

In FIGURE 5, the running length of line 20 is drawn tight to maintain knot 21 firmly against sinker 10. In FIGURE 6, with the right hand maintaining tension on the running length of line 20, the left hand grasps fishhook 40, inserting it into the groove provided in sinker 10, so that the shank of the fishhook lies in the long portion 13 of the groove and the curved head having the barb at the end is received within portion 14 of the groove, this configuration of the groove having been described above with reference to FIGURES 1 through 4.

In FIGURE 7, the thumb of the right hand maintains pressure on hook 40 to retain it within the groove, while the left hand seizes fishhook 30 and places it within the groove alongside fishhook 40. In FIGURE 8, the thumb of the right hand maintains pressure on both fishhooks while the left hand winds the portion of line 20 which extends between knot 21 and eye 31 of fishhook 30 firmly about the neck 11 of sinker 10. In FIGURE 9, there is illustrated the concluding step, in which the running length of line 20 is given a turn about stud 15 to prevent the line from slipping off the rounded end of the sinker followed by winding the running length of line 20 about the neck 11. The stud 15 not only facilitates starting of the winding of line 20 about the sinker but also provides a stop to keep the wound line from slipping off the end of the sinker. It will of course be appreciated that the stud 15 may be replaced with other suitable formations of the end of the sinker to achieve the same functions as stud 15. In finishing the storing operation, a tuck under the last loop on the sinker to prevent unraveling may be made as is shown in FIGURE 9.

Thus, it will be seen that fishhooks 30 and 40 will be firmly retained within the groove provided in sinker 10, and will be held firmly in place by the winding of line 20 about neck 11.

While I have illustrated the invention in only one embodiment, it will be apparent to those skilled in the art that various modifications may be made without departing from the scope of the invention. Therefore, I do not wish to be limited to the specific embodiment illustrated, but contemplate other embodiments or modifications of the invention may be made as are embraced by the claims which follow.

I claim:

1. A fishing sinker adapted for attachment to a fishing line said sinker comprising an elongated body having an exterior surface extending along one sidewall of said body, said surface being substantially straight lengthwise of said body, said body having a shallow groove, the bottom surface of said groove being hook-shaped in configuration following the general contour of said body lengthwise along said exterior surface, around one end of said body and back along the opposite sidewall of said body, said groove terminating in a shoulder on said opposite sidewall a short distance from said one end, said groove being open to expose said bottom surface throughout its length and having a depth to permit a fishhook to be mounted in said groove with the interior surface of said fishhook lying against said bottom surface and the exterior surface of said fishhook lying substantially within the exterior surface of said body with the point of the fishhook facing said shoulder, said body having a recess in said opposite sidewall between said shoulder and the end of said body opposite said one end to facilitate wrapping of a fishing line around said body to retain the fishhook in said groove.

2. A fishing sinker as recited in claim 1 further comprising a stud having tapered sides and a rounded top protruding from said opposite sidewall between said recess and said opposite end.

3. A fishing sinker as recited in claim 1 wherein said groove has a widened end portion on said one sidewall adjacent said opposite end of said body to accommodate the eye of a fishhook mounted in said groove.

References Cited in the file of this patent
UNITED STATES PATENTS

| | | |
|---|---|---|
| 2,514,110 | Warren | July 4, 1950 |
| 2,753,652 | Romaine | July 10, 1956 |
| 2,831,288 | Killebrew | Apr. 22, 1958 |